United States Patent
Broy et al.

(10) Patent No.: US 11,840,184 B2
(45) Date of Patent: Dec. 12, 2023

(54) METHOD FOR DETERMINING A DIGITAL ASSISTANT FOR CARRYING OUT A VEHICLE FUNCTION FROM A PLURALITY OF DIGITAL ASSISTANTS IN A VEHICLE, COMPUTER-READABLE MEDIUM, SYSTEM, AND VEHICLE

(71) Applicant: Bayerische Motoren Werke Aktiengesellschaft, Munich (DE)

(72) Inventors: Nora Broy, Munich (DE); Viviane Ghaderi, Empfingen (DE); Christian Suess, Vierkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 544 days.

(21) Appl. No.: 17/261,448

(22) PCT Filed: May 24, 2019

(86) PCT No.: PCT/EP2019/063483
§ 371 (c)(1),
(2) Date: Jan. 19, 2021

(87) PCT Pub. No.: WO2020/025186
PCT Pub. Date: Feb. 6, 2020

(65) Prior Publication Data
US 2021/0316682 A1    Oct. 14, 2021

(30) Foreign Application Priority Data
Aug. 2, 2018  (DE) .................... 10 2018 212 902.9

(51) Int. Cl.
*B60R 16/037*    (2006.01)
*B60R 25/25*    (2013.01)
(Continued)

(52) U.S. Cl.
CPC ........ *B60R 16/0373* (2013.01); *B60R 25/257* (2013.01); *G10L 15/22* (2013.01); *B60R 25/31* (2013.01); *G10L 2015/223* (2013.01)

(58) Field of Classification Search
CPC ....... G10L 15/25; G10L 15/285; G10L 25/03; G10L 25/48; G10L 2015/223;
(Continued)

(56) References Cited

U.S. PATENT DOCUMENTS

| | | | | | |
|---|---|---|---|---|---|
| 5,055,939 | A | * | 10/1991 | Karamon | G11B 27/10 386/338 |
| 6,243,683 | B1 | * | 6/2001 | Peters | G10L 15/24 704/273 |

(Continued)

FOREIGN PATENT DOCUMENTS

| | | | | | |
|---|---|---|---|---|---|
| CA | 3029444 | C | * | 8/2021 | ............. G10L 15/22 |
| DE | 202017106586 | U1 | * | 7/2018 | ......... G06K 9/00255 |

(Continued)

OTHER PUBLICATIONS

International Search Report (PCT/ISA/210) issued in PCT Application No. PCT/EP2019/063483 dated Aug. 19, 2019 (three (3) pages).

(Continued)

*Primary Examiner* — Mohammad K Islam
(74) *Attorney, Agent, or Firm* — Crowell & Moring LLP

(57) ABSTRACT

A digital assistant is determined from a plurality of digital assistants in a vehicle for performing a vehicle function. A speech message of a vehicle occupant is received via a digital assistant from the plurality of digital assistants in the vehicle. A command of the speech message is ascertained via the digital assistant. An execution authorization of the vehicle occupant is determined for the command of the speech message via the digital assistant. If the vehicle (Continued)

occupant has an execution authorization for the command of the speech message, command of the speech message is executed via the digital assistant in order perform the vehicle function in the vehicle.

16 Claims, 1 Drawing Sheet

(51) Int. Cl.
    *G10L 15/22* (2006.01)
    *B60R 25/31* (2013.01)
(58) Field of Classification Search
    CPC .......... G10L 15/22; G06T 7/254; G06T 7/20; B60R 11/04; B60R 25/257; B60R 25/31; G06F 3/167
    See application file for complete search history.

(56) References Cited

U.S. PATENT DOCUMENTS

| | | | | |
|---|---|---|---|---|
| 6,567,775 B1* | 5/2003 | Maali | ...................... | G06V 20/40 704/231 |
| 7,472,063 B2* | 12/2008 | Nefian | .................. | G06F 18/256 704/256.1 |
| 7,957,542 B2* | 6/2011 | Sarrukh | ............... | G10K 11/341 704/226 |
| 8,700,392 B1* | 4/2014 | Hart | ........................ | G10L 15/25 704/231 |
| 8,913,103 B1* | 12/2014 | Sargin | .................... | G06V 40/16 348/14.12 |
| 9,832,583 B2* | 11/2017 | Cohen | .................... | H04M 3/568 |
| 9,881,610 B2* | 1/2018 | Connell | .................. | G10L 15/25 |
| 9,922,646 B1* | 3/2018 | Blanksteen | ............ | G06F 3/167 |
| 10,154,361 B2* | 12/2018 | Tammi | ..................... | H04S 7/30 |
| 10,332,515 B2* | 6/2019 | Kim | ........................ | G10L 25/78 |
| 10,374,816 B1* | 8/2019 | Leblang | ............ | H04M 3/42204 |
| 2004/0220705 A1* | 11/2004 | Basir | ................. | B60R 21/01538 701/1 |
| 2009/0015651 A1* | 1/2009 | Togami | .................. | G10L 21/00 348/14.01 |
| 2009/0055180 A1* | 2/2009 | Coon | .................. | B60R 16/0373 704/251 |
| 2009/0150149 A1* | 6/2009 | Culter | ................... | G06F 18/256 704/201 |
| 2010/0194863 A1* | 8/2010 | Lopes | ....................... | G06T 7/12 715/848 |
| 2010/0265164 A1* | 10/2010 | Okuno | .................. | H04S 7/304 345/8 |
| 2011/0224978 A1* | 9/2011 | Sawada | ................. | G06V 40/16 704/E15.001 |
| 2012/0069131 A1* | 3/2012 | Abelow | ............. | G06Q 30/0601 345/589 |
| 2013/0030811 A1* | 1/2013 | Olleon | .................... | B60K 35/00 348/148 |
| 2013/0169801 A1* | 7/2013 | Martin | ...................... | G06T 7/80 348/222.1 |
| 2014/0187219 A1* | 7/2014 | Yang | ..................... | H04W 4/023 455/418 |
| 2014/0214424 A1* | 7/2014 | Wang | .................... | G10L 15/063 704/246 |
| 2014/0309862 A1 | 10/2014 | Ricci | | |
| 2014/0365228 A1* | 12/2014 | Ng-Thow-Hing | ...... | G06F 3/017 704/275 |
| 2014/0372100 A1* | 12/2014 | Jeong | ..................... | G06T 13/40 704/2 |
| 2015/0023256 A1* | 1/2015 | Liu | .......................... | H04W 4/40 370/329 |
| 2015/0058004 A1* | 2/2015 | Dimitriadis | ............. | G10L 25/78 704/233 |
| 2015/0139426 A1* | 5/2015 | Tammi | .................. | H04R 3/005 381/17 |
| 2015/0154957 A1* | 6/2015 | Nakadai | ................. | G10L 15/26 704/235 |
| 2015/0254058 A1* | 9/2015 | Klein | ..................... | G10L 15/22 704/275 |
| 2015/0324636 A1* | 11/2015 | Bentley | ................. | A63F 13/212 386/227 |
| 2015/0340040 A1* | 11/2015 | Mun | ....................... | G10L 17/22 704/246 |
| 2016/0064000 A1* | 3/2016 | Mizumoto | .............. | G10L 17/02 704/233 |
| 2016/0100092 A1* | 4/2016 | Bohac | .................... | H04N 7/188 382/103 |
| 2016/0111091 A1* | 4/2016 | Bakish | .................... | G10L 15/30 704/275 |
| 2016/0140964 A1* | 5/2016 | Connell | .................. | G10L 15/07 704/231 |
| 2016/0358604 A1* | 12/2016 | Dreuw | ..................... | G10L 15/22 |
| 2017/0113627 A1* | 4/2017 | Ding | .......................... | B60R 1/12 |
| 2017/0133036 A1* | 5/2017 | Cohen | .................... | H04N 7/147 |
| 2017/0309275 A1* | 10/2017 | Takayanagi | ............. | G10L 15/32 |
| 2017/0309289 A1* | 10/2017 | Eronen | .................. | H04R 1/406 |
| 2017/0351485 A1* | 12/2017 | Kohler | ..................... | G06F 3/165 |
| 2018/0018964 A1* | 1/2018 | Reilly | ..................... | G10L 15/02 |
| 2018/0033447 A1* | 2/2018 | Ramprashad | ........... | G10L 25/21 |
| 2018/0077492 A1* | 3/2018 | Yamada | .................. | H04R 3/12 |
| 2018/0174583 A1* | 6/2018 | Zhao | ....................... | G10L 25/78 |
| 2018/0190282 A1* | 7/2018 | Mohammad | ......... | G10K 11/178 |
| 2018/0233147 A1* | 8/2018 | Tukka | ..................... | G10L 15/30 |
| 2018/0286404 A1* | 10/2018 | Cech | ....................... | G10L 15/25 |
| 2019/0037363 A1* | 1/2019 | Tzirkel-Hancock | .... | H04W 4/48 |
| 2019/0073999 A1* | 3/2019 | Prémont | ................ | G10L 15/08 |
| 2019/0237067 A1* | 8/2019 | Friedman | ............... | H04R 1/406 |
| 2019/0333508 A1* | 10/2019 | Rao | ......................... | G10L 15/25 |
| 2019/0355352 A1* | 11/2019 | Kane | ....................... | G06V 20/59 |
| 2019/0394339 A1* | 12/2019 | Seo | ....................... | H04R 1/1083 |
| 2021/0327432 A1* | 10/2021 | Schwartz | ................ | G10L 21/06 |
| 2023/0228832 A1* | 7/2023 | Kozyr | ................ | G08B 21/0446 367/124 |

FOREIGN PATENT DOCUMENTS

| | | |
|---|---|---|
| EP | 2 040 208 A2 | 3/2009 |
| EP | 3 264 266 A1 | 1/2018 |
| EP | 3 330 827 A1 | 6/2018 |
| EP | 3 348 441 A1 | 7/2018 |
| WO | WO 2015/030710 A1 | 3/2015 |
| WO | WO 2015/077662 A1 | 5/2015 |
| WO | WO-2017138934 A1 * | 8/2017 ............ G10L 15/08 |

OTHER PUBLICATIONS

German-language Written Opinion (PCT/ISA/237) issued in PCT Application No. PCT/EP2019/063483 dated Aug. 19, 2019 (seven (7) pages).

* cited by examiner

METHOD FOR DETERMINING A DIGITAL ASSISTANT FOR CARRYING OUT A VEHICLE FUNCTION FROM A PLURALITY OF DIGITAL ASSISTANTS IN A VEHICLE, COMPUTER-READABLE MEDIUM, SYSTEM, AND VEHICLE

BACKGROUND AND SUMMARY OF THE INVENTION

The present subject matter relates to a method for determining a digital assistant for performing a vehicle function from a plurality of digital assistants in a vehicle. The present subject matter also relates to a computer-readable medium for determining a digital assistant for performing a vehicle function from a plurality of digital assistants in a vehicle, a system for determining a digital assistant for performing a vehicle function from a plurality of digital assistants in the vehicle, and a vehicle comprising the system for determining a digital assistant for performing a vehicle function from a plurality of digital assistants in the vehicle.

Intelligent personal assistants, or digital assistants, IPAS for short, which are integrated in smartphones or loudspeakers and controlled by voice, are known from the prior art. An intelligent personal assistant, or IPA for short, can receive a voice message and perform an action, such as playing music, placing an order, or answering a question. However, if multiple IPAs are in the same location, for example in an interior of a vehicle, conflicts may arise as to which IPA is to be controlled by the speech. It is known from the prior art to identify, by means of voice recognition, a person who is allowed to control an IPA. However, in the interior of a vehicle more than one person may be authorized to control an IPA. If multiple IPAs are controlled simultaneously by different individuals in the interior of a vehicle with, for example, conflicting voice commands for controlling vehicle functions, dangerous situations may arise in the control of a vehicle.

It is therefore an object of the present subject matter to improve the efficiency of controlling vehicle functions by means of digital assistants. One object of the present subject matter is to improve the efficiency of executing commands for controlling vehicle functions by means of digital assistants in a vehicle interior.

The present subject matter is characterized by a method for determining a digital assistant for performing a vehicle function from a plurality of digital assistants in a vehicle. A digital assistant can be an intelligent personal assistant, or IPA for short. A digital assistant can be executed on a mobile terminal device, such as a smartphone, a smartwatch or another portable mobile device, and/or an electronic control unit of the vehicle. Preferably, each digital assistant is executed on a different mobile terminal device or on an electronic control unit of the vehicle. The vehicle can be a partially, highly, or fully automatically driven vehicle. The vehicle may be a land-based vehicle, such as a motor vehicle or a motorcycle. The vehicle function can be a function of a driver assistance system and/or a function of an operating interface of the vehicle.

The method comprises receiving a voice message of a vehicle occupant by means of a digital assistant from the plurality of the digital assistants in the vehicle. The vehicle occupant can be a driver, a passenger, or a vehicle occupant in other seats available in the vehicle. The plurality of the digital assistants in the vehicle can be implemented on various mobile terminal devices, an electronic control unit and/or a multimedia system or infotainment system of the vehicle. The method also comprises ascertaining a command of the voice message by means of the digital assistant and determining an execution authorization of the vehicle occupant for the voice message command by means of the digital assistant. The execution authorization for a command may be specified by a user of the vehicle, a vehicle manufacturer, or a third party. The execution authorization can comprise a software component which verifies the execution authorization. The execution authorization can comprise one or more rules and/or one or more logic components. The execution authorization can be stored in metadata associated with the command. In addition, the execution authorization can be stored in a database, a hash table, or another known storage unit.

If the vehicle occupant has authorization to execute the command of the voice message, the method comprises executing the command of the voice message by means of the digital assistant to perform the vehicle function in the vehicle.

Advantageously, determining an execution authorization for a command of a digital assistant in a vehicle can be used to effectively improve the control of vehicle functions by means of digital assistants. The safety of the use of a plurality of digital assistants in a vehicle can be efficiently increased by only one digital assistant being granted an execution authorization. At the same time, the misuse of digital assistants in a vehicle can be efficiently reduced.

According to an advantageous design of the present subject matter, the reception of the voice message of the vehicle occupant by the digital assistant from the plurality of the digital assistants can comprise receiving the voice message of the vehicle occupant by means of multiple digital assistants from the plurality of the digital assistants, and checking whether the vehicle occupant is associated with a digital assistant from the plurality of the digital assistants which received the voice message. If the vehicle occupant is associated with a digital assistant from the plurality of the digital assistants which received the voice message, receiving the voice message may further comprise receiving the voice message of the vehicle occupant by means of the digital assistant associated with the vehicle occupant. If the vehicle occupant is not associated with a digital assistant from the plurality of digital assistants which received the voice message, the method can reject the voice message of the vehicle occupant by means of the digital assistant, and/or the method can transmit the voice message of the vehicle occupant to a central digital assistant, which transmits the voice message of the vehicle occupant to the digital assistant associated with the vehicle occupant, and can receive the voice message of the vehicle occupant by means of the digital assistant associated with the vehicle occupant. This allows the voice message to be efficiently assigned to a digital assistant which can process the voice message of the vehicle occupant.

According to a further, advantageous design of the present subject matter, the vehicle occupant can be uniquely associated with a digital assistant from the plurality of the digital assistants, and/or a digital assistant can be uniquely identifiable from the plurality of digital assistants. This allows a voice message from a vehicle occupant to be easily assigned to a digital assistant and a digital assistant in the vehicle to be uniquely identified.

According to a further, advantageous design a digital assistant, preferably all digital assistants, from the plurality of the digital assistants can be registered with a central digital assistant of the vehicle. This ensures that only digital assistants registered with the vehicle can perform vehicle functions.

According to a further, advantageous design, the execution authorization can be determined based on a seat position of the vehicle occupant in the vehicle. This enables the execution authorization to be determined efficiently.

According to a further, advantageous design, the execution authorization can be determined based on a ranking of the digital assistant with respect to a ranking of the plurality of the digital assistants. This enables the execution authorization to be determined efficiently.

According to a further, advantageous design, the execution authorization can be determined based on a type of the command in the voice message. This enables the execution authorization to be determined efficiently.

According to a further, advantageous design, the execution authorization can be determined based on a predefined access control list. This enables the execution authorization to be determined efficiently.

According to a further, advantageous design, the execution authorization can be determined according to one or more personal preferences of the vehicle occupant that are associated with the digital assistant of the vehicle occupant, and/or according to one or more personal preferences of vehicle occupants that are associated with other digital assistants from the plurality of the digital assistants. This enables the execution authorization to be determined efficiently.

According to a further advantageous design, the execution authorization can be determined by means of a context of the command, and/or the execution authorization can be determined by the central digital assistant. This enables the execution authorization to be determined efficiently.

According to a further, advantageous design, if the vehicle occupant does not have an execution authorization for the voice message command, the method can additionally identify an additional digital assistant from the plurality of assistants in the vehicle, wherein the additional digital assistant is associated with another vehicle occupant who can grant an execution authorization for the command. In addition, the method can comprise providing a voice message by means of the additional digital assistant to the additional vehicle occupant associated with the additional digital assistant, to determine the execution authorization of the command. The method can also receive a reply voice message from the additional vehicle occupant by means of the additional digital assistant in response to the provided voice message to determine the execution authorization of the command, wherein the reply voice message contains an execution authorization of the command or no execution authorization of the command. If the reply voice message of the additional vehicle occupant contains an execution authorization for the command, the method can execute the command by means of the additional digital assistant to perform the vehicle function in the vehicle. This allows an execution authorization for a command to perform a vehicle function to be provided efficiently by an additional vehicle occupant.

According to a further, advantageous design, the method can also comprise, if the reply voice message of the other vehicle occupant does not contain an execution authorization of the command, refusing the execution of the command by means of the additional digital assistant and/or by means of the digital assistant. This can be used to efficiently prevent an additional passenger from executing the command.

According to a further, advantageous design, the plurality of the digital assistants can be executed on different mobile terminal devices, and/or the central digital assistant can be executed on an electronic control unit of the vehicle, and/or the plurality of the digital assistants can comprise all digital assistants of vehicle occupants that are coupled to the vehicle. This makes it easy to use vehicle-external digital assistants to perform vehicle functions.

According to a further advantageous design of the present subject matter, any digital assistant from the plurality of the digital assistants can be associated with a seat position in the vehicle, and/or a hierarchy of digital assistants from the plurality of the digital assistants can be determined based on the seat position with which a digital assistant is associated. This enables an efficient determination of an execution authorization based on seat position.

According to another aspect, the present subject matter is characterized by a computer-readable medium for determining a digital assistant for performing a vehicle function from a plurality of digital assistants in a vehicle, wherein the computer-readable medium stores instructions which, when executed from a computer or an electronic control unit, perform the method described above.

According to a further aspect, the present subject matter is characterized by a system for determining a digital assistant for performing a vehicle function from a plurality of digital assistants in a vehicle, wherein the system is designed to perform the method described above.

According to a further aspect, the present subject matter is characterized by a vehicle comprising the above-described system for determining a digital assistant for performing a vehicle function from a plurality of digital assistants in the vehicle.

Additional features of the present subject matter arise from the claims, the figures, and the description of the figures. All the features and feature combinations cited in the description above, and the features and feature combinations cited in the description of the figures below and/or shown in the figures alone are applicable not only in the respective combination indicated, but also in other combinations or else in isolation.

One of the aims of the present subject matter is to detect and resolve possible conflicts in the execution of commands by different digital assistants or intelligent personal assistants in a vehicle. For example, a ranking of the digital assistants can be used to detect a conflict in the execution of commands and to resolve this conflict using the ranking of the digital assistants. A digital assistant can be assigned a role and/or an execution permission for a command. For example, the digital assistant can be assigned the role of driver. This means that the digital assistant is the digital assistant of the driver of the vehicle and has authority to execute commands that only the driver of the vehicle can give. Examples of commands that only the driver of the vehicle can give are driving-specific commands that influence driving dynamics and/or route guidance of the vehicle. Other digital assistants that are present in the vehicle do not have execution authorization for driving-specific commands and reject the driving-specific commands. In addition, a digital assistant may have predefined and/or user-specific blocks on functions that prevent the execution of commands from the blocked functions.

A digital assistant may be ranked higher than one or more other digital assistants in relation to a predefined, vehicle-specific and/or user-specific ranking. A digital assistant with a higher ranking can have more execution rights for commands. In addition, a digital assistant with a higher ranking can transfer execution rights to a command to one or more digital assistants that are situated below the digital assistant in the ranking. In addition or alternatively, a digital assistant with a lower ranking can request rights for one or more commands from a digital assistant with a higher ranking. For example, a digital assistant of a parent part in the vehicle may transfer execution rights for one or more commands and/or functions to a digital assistant of a child temporarily for a single execution of a command, or permanently for every execution of the command. In addition, a digital assistant with a higher ranking can control microphones of digital assistants with a lower ranking, for example switch them on or off.

The vehicle may have a central digital assistant executed on an electronic control unit or a computer of the vehicle, and in which all other digital assistants in the vehicle are registered. Preferably, the central digital assistant of the vehicle has the highest ranking.

The digital assistants in a vehicle can communicate with each other and/or via a central digital assistant of the vehicle through a communication channel to detect any conflict and/or to prioritize one or more commands between the digital assistants in the vehicle. For example, a command can be prioritized based on metadata from one or more digital assistants.

DETAILED DESCRIPTION OF THE DRAWING

Figure 1:
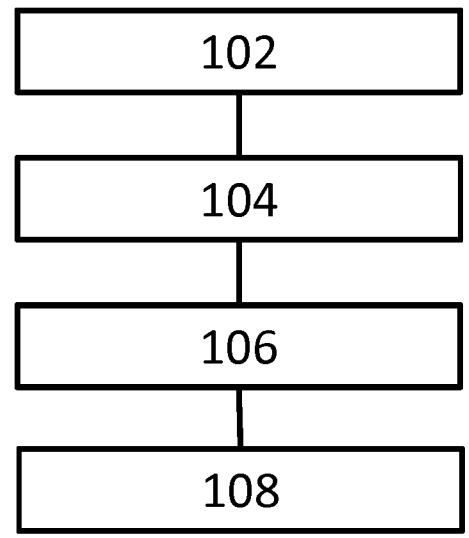
FIG. 1 shows a schematic diagram of a method for determining a digital assistant from a plurality of digital assistants.

In detail, FIG. 1 shows a method 100 for determining a digital assistant for performing a vehicle function from a plurality of digital assistants in a vehicle. The method 100 can receive 102 a voice message from a vehicle occupant by means of a digital assistant from the plurality of the digital assistants. Each digital assistant from the plurality of digital assistants can have a unique identifier, e.g. a unique name. The digital assistants in the vehicle can communicate with each other using the unique identifier of a digital assistant. If a digital assistant does not have a unique identifier, an identifier of a vehicle occupant who is associated with the digital assistant can also be used to uniquely identify the digital assistant. In addition or alternatively, a digital assistant can be uniquely identified with regard to a function provided by the digital assistant, and/or with regard to a vehicle occupant who has been identified as the sender of the voice message. Preferably, each digital assistant is uniquely assigned to a vehicle occupant, so that a unique assignment to a digital assistant is possible by means of the identification of the vehicle occupant.

All digital assistants from the plurality of the digital assistants can receive a voice message, or only the digital assistant that can process the voice message. When a voice message is received by a digital assistant that cannot process the voice message, the receiving digital assistant can forward the voice message to a digital assistant that can process the voice message. Alternatively, a digital assistant that cannot process the voice message can reject the voice message.

The voice message can also be received by means of the digital assistant via a central digital assistant. The central digital assistant is a digital assistant provided by the vehicle and with which preferably all other digital assistants from the plurality of digital assistants are registered. The central digital assistant can switch off one or more audio channels between one or more microphones and a digital assistant, preferably all registered digital assistants. The voice message can then be received via the microphones of the central digital assistant.

The method 100 can ascertain 104 one or more commands of the voice message by means of the digital assistant and/or the central digital assistant. A command can control the execution of a vehicle function. The vehicle function can be provided via an interface of the vehicle. For example, the vehicle function can be a function of a driver assistance system, an infotainment system function, or a function that controls an actuator of the vehicle.

In addition, the method 100 can determine 106 an execution authorization of the vehicle occupant for the command of the voice message. The execution authorization can be determined by the digital assistant which has ascertained the command of the voice message, and/or by the central digital assistant of the vehicle.

If the vehicle occupant has an execution authorization for the voice message command, the method can execute 108 the voice message command to perform the vehicle function in the vehicle. Preferably, the voice message command can be executed by the digital assistant which processes the voice message, or by the central digital assistant of the vehicle. For example, the digital assistant can send the command to perform the vehicle function to the vehicle's central digital assistant to perform the vehicle function. The central digital assistant of the vehicle can receive the command from the digital assistant and execute the command to perform the vehicle function.

If the vehicle occupant does not have an execution authorization for the voice message command, the method can identify an additional digital assistant from the plurality of digital assistants in the vehicle, wherein the additional digital assistant is associated with an additional vehicle occupant who can grant an execution authorization for the command. Preferably, the additional digital assistant can be determined by means of a ranking of all digital assistants in the vehicle. The ranking of all digital assistants in the vehicle can be predefined or determined dynamically. For example, the ranking can be dynamically determined using a seat position of a vehicle occupant who is associated with a digital assistant.

The additional digital assistant can provide a voice message to the additional vehicle occupant associated with the additional digital assistant, to determine the execution authorization of the command. In addition, the additional digital assistant can receive a reply voice message from the additional vehicle occupant in response to the provided voice message to determine the execution authorization of the command. The response voice message can contain an execution authorization of the command or no execution authorization of the command. If the reply voice message of the additional vehicle occupant contains an execution authorization of the command, the method may transmit the positive execution authorization to the digital assistant or the central digital assistant, and the digital assistant or the central digital assistant can execute the command to perform the vehicle function in the vehicle.

If the reply voice message of the additional vehicle occupant contains no execution authorization of the command, the method can transmit the negative execution authorization to the digital assistant or the central digital assistant, and the digital assistant or the central digital assistant can refuse to execute the command.

The following text presents examples of how the method 100 can be applied to determine an execution permission for a command of a voice message of a digital assistant from the plurality of the digital assistants.

In an example, a voice message saying "turn left and set music to maximum volume" can be received by a passenger by means of the passenger's digital assistant. The passenger's digital assistant can ascertain two commands in the voice message. For each of the two commands of the voice message, the execution authorization for the passenger's digital assistant is determined. In the above example, each command is relevant to driving. This means that only the driver or the driver's digital assistant has the authority to execute the two commands. For this reason, it is necessary to request the driver's consent so that the passenger's digital assistant obtains the execution authorization for the two commands. To this end, the passenger's digital assistant can send a message to provide an execution authorization for the two commands to the driver's digital assistant. The driver's digital assistant can receive the message to provide an execution authorization for the two commands and output a message to the driver as a voice message to query the execution authorizations for the two commands. For example, the driver's digital assistant can ask the driver if the passenger can turn the vehicle to the left and set the music to the maximum volume. The driver's digital assistant can wait for a response voice message from the driver. For example, the driver's digital assistant may receive the reply voice message with the content "no". The driver's digital assistant can then send the passenger's digital assistant a negative execution authorization for the two commands. The passenger's digital assistant can receive the negative execution authorization for the two commands and reject the two commands from the passenger.

In another example, the vehicle occupants are a child and the father of the child. The child's digital assistant receives a voice message that contains a command that refers to the father, who is also seated in the vehicle as a vehicle occupant, or requires permission from the child's father. To obtain execution authorization, the child's digital assistant can send a request to the father's digital assistant for execution authorization of the command. As described above, the father can communicate a positive or a negative execution authorization to his digital assistant. Accordingly, the command can be executed or rejected by the child's digital assistant.

In a further example, the occupants of the vehicle are at least two people, each of whom issues a voice message with the same command at the same time, with temporal overlap or within a short time of each other, for example within a second or a few seconds, and which are received by their respective digital assistants. To determine which of the two commands is executed, a ranking of the digital assistants can be set up. The higher digital assistant in the ranking receives the execution authorization for the command. The ranking can be based, for example, on the seat positions of the vehicle occupants. The highest ranking is associated, for example, with the driver's seat position, the second highest ranking with the passenger's seat position. In addition or alternatively, the ranking of the digital assistants can be created by means of a social ranking of the persons associated with the respective digital assistant. For example, if a professional ranking of one of the two vehicle occupants is higher, the execution authorization for the command is assigned to the digital assistant, the linked vehicle occupant of which has the higher professional ranking.

Additionally or alternatively, the ranking can be created based on the technical characteristics of the respective digital assistants. For example, if the command concerns a function for playing music in the vehicle, then the ranking of the digital assistants can be created based on the database size of the available music tracks of the digital assistants. The digital assistant with the larger database size is granted the execution permission to execute the command.

Access control lists can also be defined by a user or vehicle occupant who specifies the execution authorizations of a digital assistant or a group of digital assistants in the vehicle.

Advantageously, a single digital assistant can be efficiently identified from a plurality of the digital assistants in the vehicle, which can execute a command to perform a vehicle function. This increases the safety of the use of digital assistants in the vehicle. Furthermore, the misuse of digital assistants in the vehicle can be efficiently reduced.

LIST OF REFERENCE SIGNS

100 method
102 receiving a voice message
104 ascertaining a command from the voice message
106 determining an execution authorization
108 executing a command

What is claimed is:

1. A method for determining a digital assistant for performing a vehicle function from a plurality of digital assistants in a vehicle, the method comprising:
   receiving a voice message of a vehicle occupant via a digital assistant from the plurality of digital assistants in the vehicle;
   ascertaining a command of the voice message via the digital assistant;
   determining an execution authorization of the vehicle occupant for the command of the voice message via the digital assistant;
   if the vehicle occupant has an execution authorization for the voice message command:
      executing the command of the voice message via the digital assistant to perform the vehicle function in the vehicle;
   if the vehicle occupant has no execution authorization for the voice message command:
      identifying an additional digital assistant from the plurality of the digital assistants in the vehicle, wherein
         the additional digital assistant is associated with an additional vehicle occupant who can grant an execution authorization for the command;
      providing a voice message via the additional digital assistant to the additional vehicle occupant associated with the additional digital assistant to determine the execution authorization of the command;
      receiving a reply voice message from the additional vehicle occupant via the additional digital assistant in response to the provided voice message to determine the execution authorization of the command, wherein
         the reply voice message contains an execution authorization of the command or no execution authorization of the command; and
      if the reply voice message of the additional vehicle occupant contains an execution authorization for the command:

executing the command via the digital assistant to perform the vehicle function in the vehicle.

2. The method according to claim 1, wherein the reception of the voice message of the vehicle occupant via the digital assistant from the plurality of digital assistants comprises:
receiving the voice message of the vehicle occupant via multiple digital assistants from the plurality of the digital assistants;
checking whether the vehicle occupant is associated with a digital assistant from the plurality of the digital assistants which received the voice message;
if the vehicle occupant is associated with a digital assistant from the plurality of the digital assistants which received the voice message:
receiving the voice message of the vehicle occupant via the digital assistant that is associated with the vehicle occupant;
if the vehicle occupant is not associated with a digital assistant from the plurality of the digital assistants which received the voice message:
discarding the voice message of the vehicle occupant via the digital assistant; and/or
transmitting the voice message of the vehicle occupants to a central digital assistant, which transmits the voice message of the vehicle occupant to the digital assistant associated with the vehicle occupant; and
receiving the voice message of the vehicle occupant via the digital assistant that is associated with the vehicle occupant.

3. The method according to claim 1, wherein
the vehicle occupant is uniquely associated with a digital assistant from the plurality of the digital assistants; and/or
a digital assistant is uniquely identifiable from the plurality of the digital assistants.

4. The method according to claim 1, wherein
one or more of the digital assistants from the plurality of the digital assistants is/are registered with a central, digital assistant of the vehicle.

5. The method according to claim 1, wherein
the execution authorization is determined on based on a seat position of the vehicle occupant in the vehicle.

6. The method according to claim 1, wherein
the execution authorization is determined based on a ranking of the digital assistant with respect to a ranking of the plurality of the digital assistants.

7. The method according to claim 1, wherein
the execution authorization is determined based on the type of the voice message command.

8. The method according to claim 1, wherein,
the execution authorization is determined the basis of a predefined access control list.

9. The method according to claim 1, wherein
the execution authorization is determined:
according to one or more personal preferences of the vehicle occupant that are associated with the digital assistant of the vehicle occupant, and/or
according to one or more personal preferences of vehicle occupants that are associated with other digital assistants from the plurality of the digital assistants.

10. The method according to claim 2, wherein
the execution authorization is determined via a context of the command; and/or
the execution authorization is determined by the central digital assistant.

11. The method according to claim 1, the method further comprising:
if the reply voice message of the additional vehicle occupant contains no execution authorization for the command:
refusing an execution of the command by the additional digital assistant and/or by the digital assistant.

12. The method according to claim 2, wherein
the plurality of the digital assistants are executed on different mobile terminal devices,
the central digital assistant is executed on a control unit of the vehicle, and/or
the plurality of the digital assistants comprises all the digital assistants of vehicle occupants that are coupled to the vehicle.

13. The method according to claim 1, wherein
each digital assistant from the plurality of the digital assistants is associated with a seat position in the vehicle; and/or
a hierarchy of digital assistants is ascertained from the plurality of the digital assistants based on the seat position with which a digital assistant is associated.

14. A non-transitory computer-readable medium comprising instructions for determining a digital assistant for performing a vehicle function from a plurality of digital assistants in a vehicle, the instructions operable, when executed by one or more computing systems, to perform the method according to claim 1.

15. A system for determining a digital assistant for performing a vehicle function from a plurality of digital assistants in a vehicle, the system comprising:
an electronic control unit to perform the method according to claim 1.

16. A vehicle comprising the system according to claim 15.

* * * * *